March 8, 1949.  A. D. JOHNSON  2,463,878
MAGAZINE FILM HOLDER FOR CAMERAS
Filed Jan. 8, 1948  5 Sheets-Sheet 1
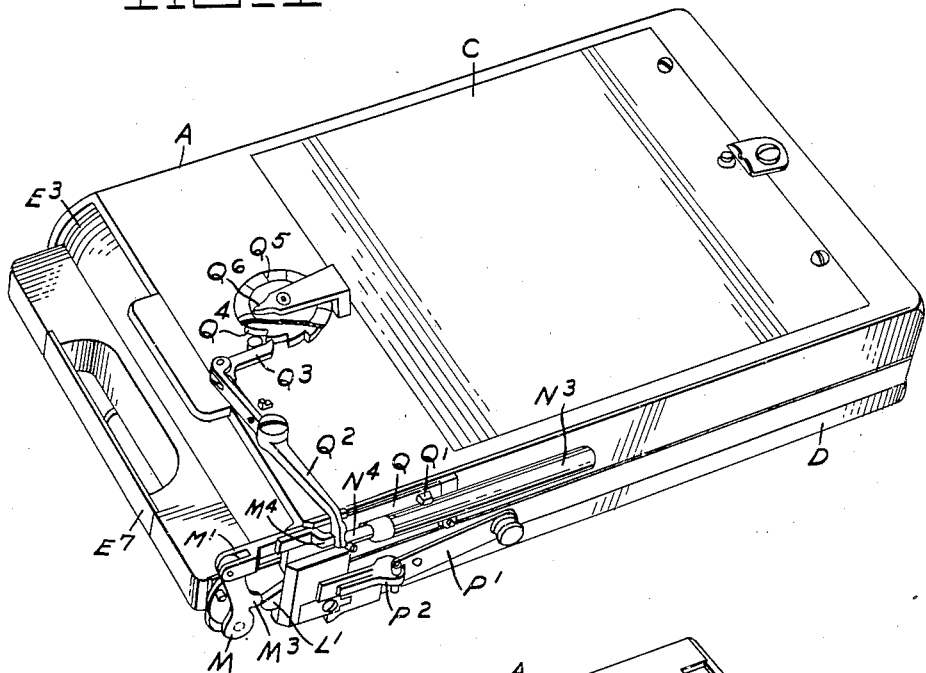
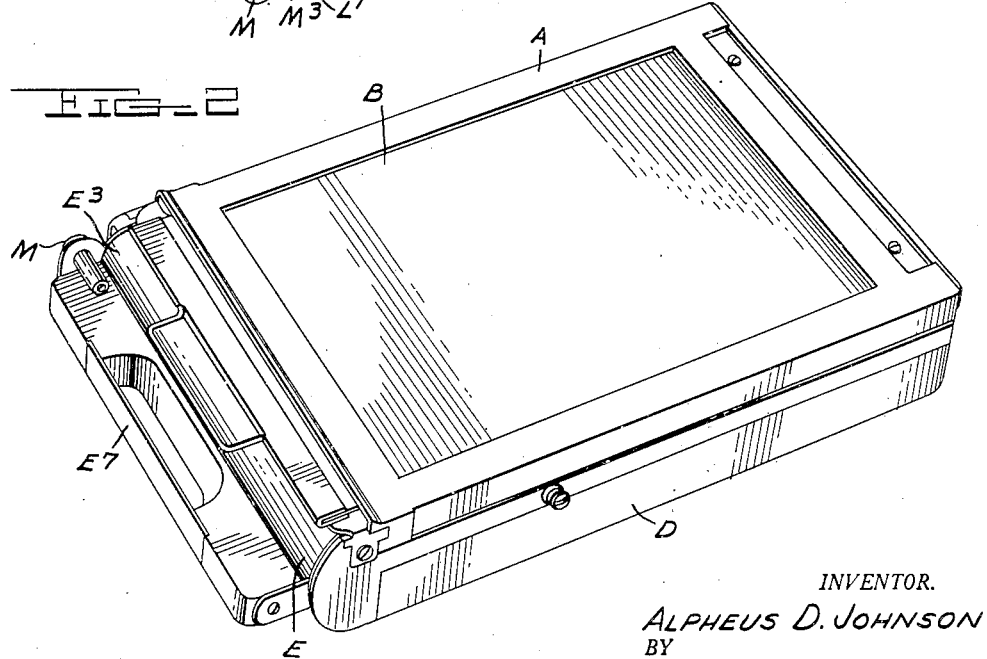
INVENTOR.
ALPHEUS D. JOHNSON
BY
Whittemore Hulbert + Belknap
ATTORNEYS March 8, 1949.  A. D. JOHNSON  2,463,878
MAGAZINE FILM HOLDER FOR CAMERAS
Filed Jan. 8, 1948  5 Sheets-Sheet 2
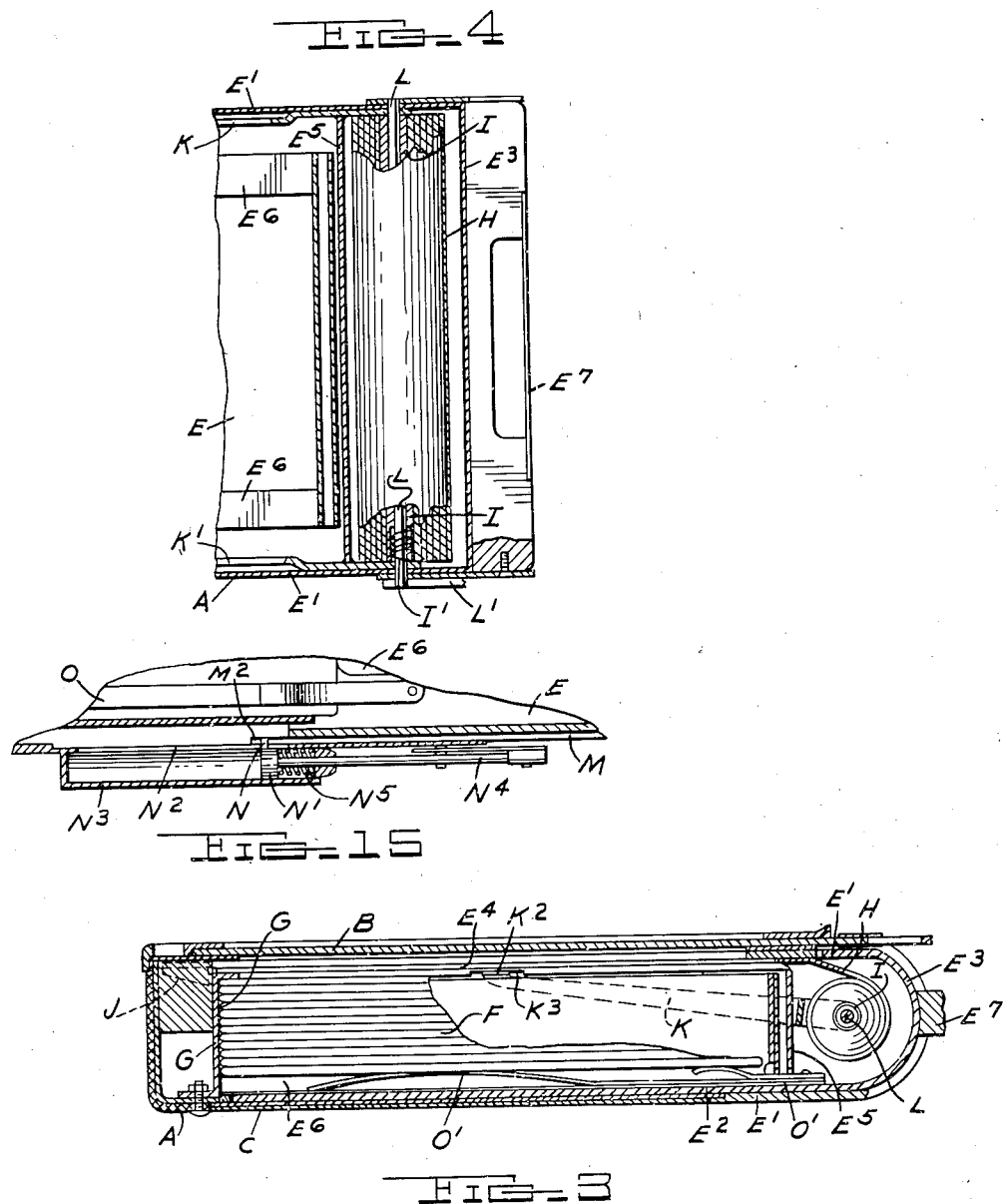
INVENTOR.
ALPHEUS D. JOHNSON
BY
Whittemore Hulbert & Belknap
ATTORNEYS

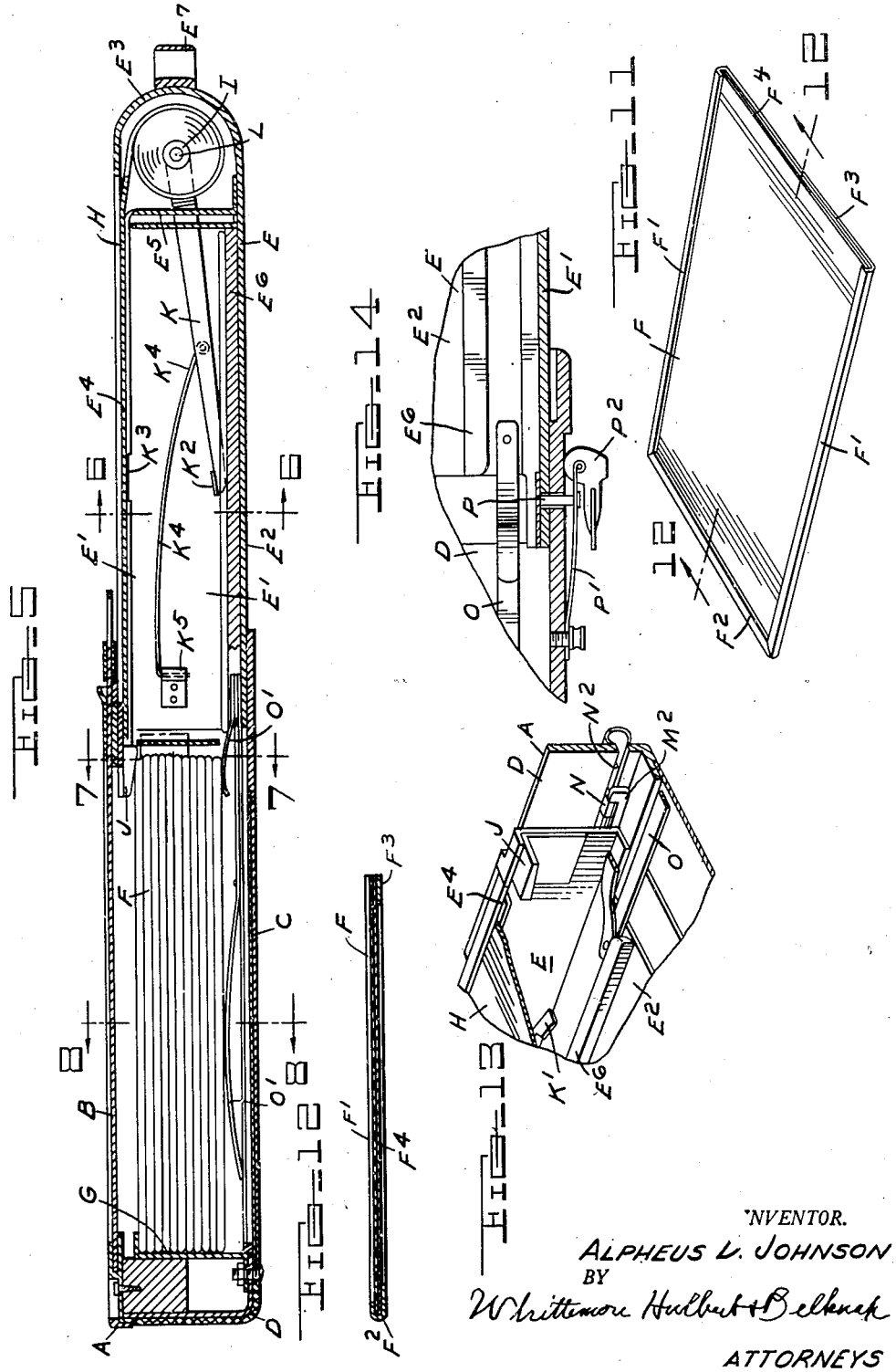

March 8, 1949. A. D. JOHNSON 2,463,878
MAGAZINE FILM HOLDER FOR CAMERAS
Filed Jan. 3, 1948 5 Sheets-Sheet 4
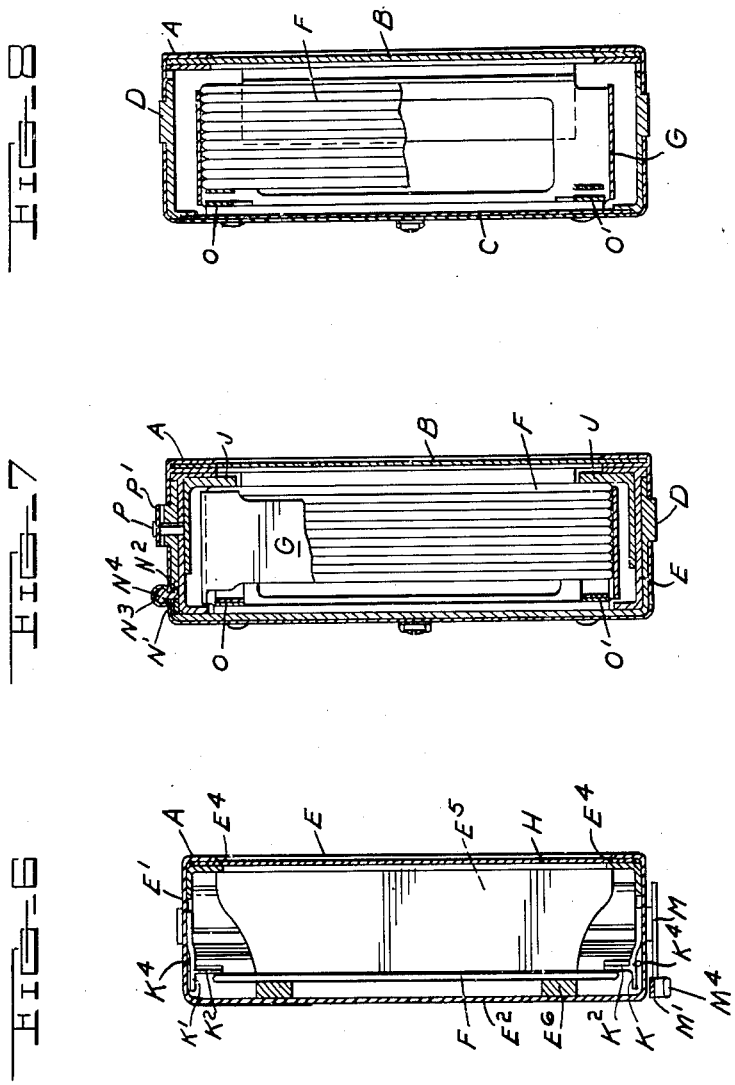
INVENTOR.
ALPHEUS D. JOHNSON
BY
ATTORNEYS March 8, 1949. A. D. JOHNSON 2,463,878
MAGAZINE FILM HOLDER FOR CAMERAS
Filed Jan. 8, 1948 5 Sheets-Sheet 5
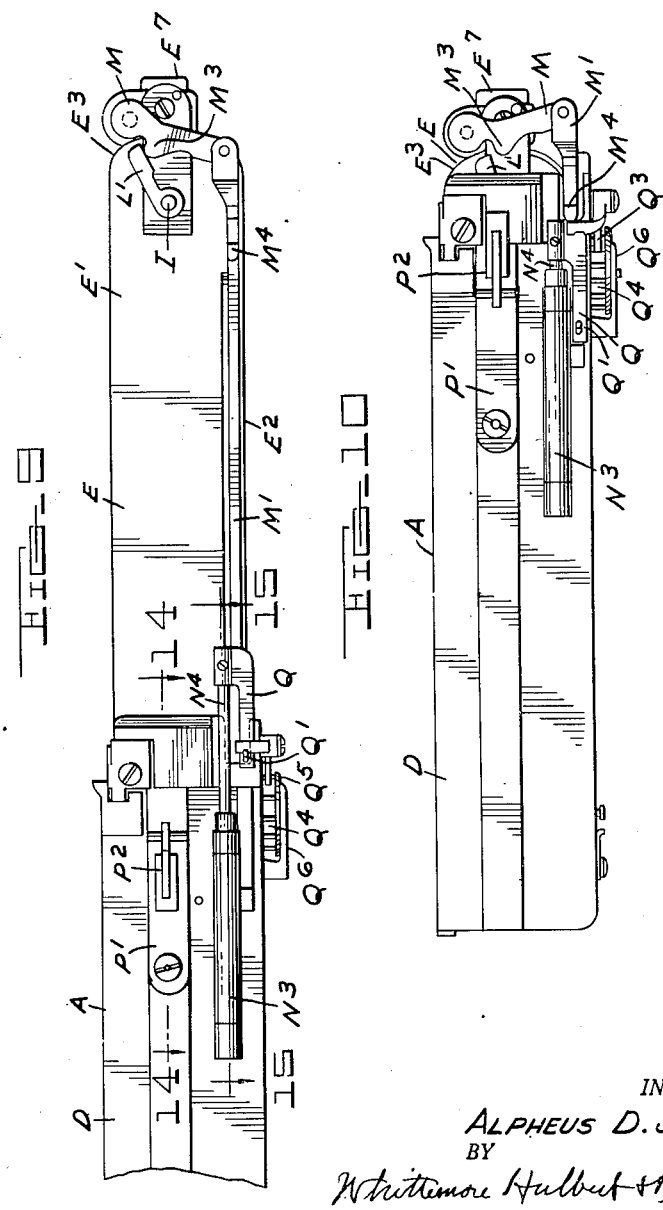
INVENTOR.
ALPHEUS D. JOHNSON
BY
ATTORNEYS Patented Mar. 8, 1949

2,463,878

UNITED STATES PATENT OFFICE 2,463,878

MAGAZINE FILM HOLDER FOR CAMERAS

Alpheus D. Johnson, Ann Arbor, Mich., assignor to Kenneth R. Wingrove, Jr., Ann Arbor, Mich.

Application January 8, 1948, Serial No. 1,181

9 Claims. (Cl. 95—23)

1

The invention relates to magazine holders for photographic films, and it is the primary object of the invention to obtain a construction which may be loaded with a stack of individual film holding frames and which is provided with means operable, while the holder remains in engagement with the camera, for transferring the holder of an exposed film from the front to the rear of the stack. To this end the invention consists first in a holder formed of telescopically engaged outer and inner casing members which, when in registration, present an open front to the camera and in extended position provide a light proof transfer chamber.

The invention further consists in a construction which during extension removes a film holder from the front of the stack into the transfer chamber and therein shifts it to a different plane for insertion in rear of the stack when the holder is contracted.

The invention further consists in the means for light proofing the extended casing without obstructing the exposure opening when the holder is contracted. The invention further consists in various features of construction as more fully hereinafter described.

In the drawings:

Figs. 1 and 2 are perspective views of the view holder showing, respectively, the rear and the front faces thereof;

Fig. 3 is a horizontal section through the holder in contracted position;

Fig. 4 is a vertical section on line 4—4, Fig. 3;

Fig. 5 is a horizontal section through the extended holder;

Figs. 6, 7 and 8 are vertical cross-sections, respectively, on lines 6—6, 7—7 and 8—8; Fig. 5;

Fig. 9 is a top plan view of the holder in extended position;

Fig. 10 is a similar view in contracted position;

Fig. 11 is a perspective view of one of the film holding frames;

Fig. 12 is a section on line 12—12, Fig. 11;

Fig. 13 is a fragmentary perspective view showing portions of the telescopically engaged casings viewed from the inside;

Fig. 14 is a horizontal section on line 14—14, Fig. 9; and

Fig. 15 is a horizontal section on line 15—15, Fig. 9.

As shown in Figs. 1 and 2 the holder A is a light proof housing, which contains a stack of film holding frames. At the front this holder is provided with the usual removable cover slide B, which can be withdrawn when the holder is in engagement with the camera to expose the foremost film of the stack. In the rear wall there is a section C which is removable to load the holder with a stack of film holding frames. The holder comprises two telescopically engaged casing sections D and E. The section D is the outer casing which is directly attached to the camera. The section E may be longitudinally withdrawn from the section D to form a transfer chamber and during such withdrawal the foremost frame of the stack containing an exposed film is carried into said transfer chamber in which it is moved by means later described into a plane in rear of the stack, so as to be carried into the casing D with the casing E when the latter is returned. Thus it will be understood that the films in the stack may be successively exposed and then transferred to the rear of the stack where they are shielded from light exposure.

While the holder is primarily designed for loading film holding frames, it of course could be used with plates instead of films. The film holders F may be of any suitable construction but, as shown in Figs. 11 and 12, they are rectangular frames having channel side bars $F'$, a channel end bar $F^2$ and an opposite end bar $F^3$. An opaque backing plate $F^4$ extends across the frame within the channels and the film is inserted in the channels in front of this backing plate. To hold a stack of film frames within the casing D, the latter is provided with a lining frame G spaced from the outer walls and of dimensions for receiving the film frames F. The spaces between the frame G and the casing D at the top and bottom thereof receives, respectively, the top and bottom walls $E'$ of the casing E, which casing is also provided with a rear wall $E^2$. The latter is normally in a space in rear of the frame G and thus the casing E may be moved telescopically without interference with said frame G. At the front the casing E, when in registration with the casing D, must be cutaway as otherwise the foremost film would not be exposed to the light in the camera. On the other hand, when the casing E is withdrawn from the casing B it must be closed at the front to form a dark chamber therewithin. Such closure is formed by a flexible curtain H, which at one end is attached to the front of the casing D beyond the exposure opening therein. In the closed position of the casing E within the casing D, the curtain is rolled on a spring actuated roller I which later is stored within a cylindrical housing portion $E^3$. When the casing E is withdrawn, the curtain will unwind from the roller I and its top and bottom edge portions will be engaged with channel bar guides $E^4$ secured to top and bottom walls $E'$ of the casing E. These will form a light seal and a further light seal is formed by a wall $E^5$ which separates the cylindrical housing portion $E^3$ from the transfer chamber. Thus the casing E when withdrawn from the casing D forms therewithin a dark chamber in which the exposed film can be transferred without danger of fogging.

For removing the foremost film frame from the stack, the housing E is provided at its inner end with a pair of dogs J which project inward from the top and bottom walls thereof and which in the closed position of said casing are located beyond the stack. These dogs have inclined rear faces to enable them to ride over the foremost film frame when the casing E is moved inward, but in the reverse or outward movement the dogs engage such foremost frame and carry it with them and the casing E beyond the frame G into the dark transfer chamber. This chamber contains a pair of levers or rock arms K and $K'$ arranged, respectively, at the top and bottom thereof and pivotally mounted on a shaft L which supports the roller I. At their free ends the levers K and $K'$ have projecting fingers $K^2$ which overlap the film frame and are normally located in recesses $K^3$ above the path of the frame when it is moved into the transfer chamber. The levers are held in such position by springs $K^4$ which are anchored at $K^5$ on the top and bottom walls of the casing E and at their opposite ends are attached to the levers K and $K'$. One end of the shaft L extends outside of the casing E and has mounted thereon a rock arm $L'$. Adjacent to this rock arm there is pivotally mounted on the casing E a rocker M having its free end pivotally connected to a rod $M'$ extending longitudinally of the casing into the space between the frame G and the top of the casing D. At its inner end this rod is provided with a hook $M^2$ which, when the rod is withdrawn, engages a finger N projecting from a piston $N'$ through a slot $N^2$ in a cylindrical housing $N^3$. A piston rod $N^4$ extends from the piston out from the housing and a spring $N^5$ sleeved on said rod resiliently presses the piston inward in the cylinder. The arrangement is such that when the casing E is drawn outward to near its outermost position, a finger $M^3$ on the rock arm M engages the rock arm $L'$ and actuates it in a direction to rock the levers K and $K'$ against the resistance of the spring $K^4$. This will carry the film frame which has just been introduced into the dark chamber towards the rear wall of said chamber where it will engage ribs $E^6$ on the wall $E^2$ and these, together with the pressure of the levers K, $K'$ will hold said frame in a position for being moved in rear of the stack when the casing E is returned into registration with the casing D. It is, however, necessary to hold the stack out of the path of this returning frame, which is accomplished by pairs of bowed springs O and $O'$ preferably mounted on the inside of the removable cover C. When the film frame is carried back with the casing E, its advancing edge will contact the inclined portion of the springs $O'$ moving the same away from their bearings on the rearmost frame of the stack for insertion of the transferred frame in rear thereof. This will bring it in alignment with the other frames in the stack, so that it may be advanced forward therewith as each successive transferred frame is introduced at the back of the stack.

For re-reeling the curtain on the roller I when the casing E is telescoped into the casing D, a coil spring $I'$ is located in a recess in the roller, one end being secured to the roller and the opposite end anchored to the shaft L. Thus when the casing E is moved inward the curtain will be rolled up to be stored in the cylindrical housing portion $E^3$. A finger grip portion $E^7$ is attached to the casing portion $E^3$ to facilitate the telescopic movement of the casing. As the reaction of the coil spring $I'$ tends to draw the casing E inward, it is desirable to provide a locking device to hold it extended when the holder is to be loaded with film frames. Such a locking device is arranged on the top of the holder and comprises a bolt P in the outer casing D actuated by a spring $P'$ and engaging an aperture in the top wall of the inner casing E when the latter is in fully withdrawn position. A cam lever $P^2$ is attached to the bolt and when this lever is turned into the position shown in Fig. 1, it will withdraw the bolt from its engagement with the inner casing. The holder is also preferably provided with a register which indicates the films that have been exposed and thus telling when the stack is exhausted. This register is automatically operated by a part of the mechanism used in operating the transfer levers K and $K'$. Thus, as previously described, the hook $M^2$ on the rod $M'$ actuates the piston $N'$ and its rod $N^4$. This rod is attached to a slide Q which has thereon a projecting lug $Q'$. A lever $Q^2$ is pivoted on the rear wall of the casing D and has an end portion which extends into the path of the lug $Q'$ so as to be actuated thereby when the casing E nears its outermost position. This lever $Q^2$ carries a pawl $Q^3$ for actuating a ratchet wheel $Q^4$ connected to an indicator $Q^5$ having divisions corresponding in number to the film holding frames in the stack. A pointer $Q^6$ cooperating with the indicator $Q^5$ shows at all times the number of films that have been exposed and those still remaining for exposure. The lever $Q^2$ is actuated in the reverse direction by a finger $M^4$ on the rod $M'$, which contacts with said lever just before the completion of the inward movement of the casing E.

Operation

To load the holder the operator removes the cover C and draws the casing E outward holding it in this position by the locking bolt P. A stack of frames can then be inserted through the opening in the rear wall, the front frame bearing against the dogs J and also a flange $G'$ on the liner frame G. The cover plate C is then replaced and the loop springs O and $O'$ thereon will bear against the rearmost film frame of the stack and hold the whole stack in position. The bolt P is then released and the casing E returned to normal position, which completes the loading operation. After the holder has been engaged with the camera, the cover slide B is withdrawn leaving the foremost film of stack ready for exposure. After the picture is taken the casing E is drawn outward and the dogs J engaging the edge of the foremost frame will carry it outward into the dark chamber provided by the casing E and curtain H. At the same time, just before the completion of this movement the hook $M^2$ engaging the finger N will arrest movement of the rod $M'$ and cause it to rock the arms M and $L'$. The latter will actuate the levers K and $K'$ causing the fingers $K^2$ on the said levers to engage with the film frame F carrying it across the dark chamber and against the ribs $E^6$ on the wall $E^2$. The casing E is then moved inward into the casing D carrying said frame with it and inserting it between the springs O and O' and the rearmost frame in the stack. The parts are now in position for another photographic exposure and these operations may be repeated as long as any unexposed films remain in the stack. When all are exposed the cover slide B is replaced and the holder may be removed to a dark room for unloading and re-loading.

What I claim as my invention is:

1. A magazine film holder for cameras, comprising telescopically engaged outer and inner casing members for receiving a stack of individual film holders, said casings in contracted position having registering front openings for photographic exposure of the front film of the stack, a cover slide for closing the exposure opening in the outer casing, means for closing the front of the inner casing when withdrawn from the outer casing thereby forming therewithin a dark chamber, means connected to said inner casing for engaging the foremost film holder of the stack to withdraw the same into said dark chamber when said inner casing is drawn outward, and means in said dark chamber for transferring the film holder therein into a plane in rear of the stack whereby upon return of said inner casing said holder is positioned in rear of the other holders in the stack.

2. A magazine film holder for cameras, comprising telescopically engaged outer and inner casing members for receiving a stack of individual film holders, said casings in contracted position having registering front openings for photographic exposure of the front film of the stack, a cover slide for closing the exposure opening in the outer casing, a rolled curtain on one of said casings and connected to the other adapted to be extended by the outward movement of said inner casing to close the front thereof and form a dark chamber therewithin, means connected to said inner casing for engaging the foremost film holder of the stack to withdraw the same into said dark chamber when said inner casing is drawn outward, and means in said dark chamber for transferring the film holder therein into a plane in rear of the stack whereby upon return of said inner casing said holder is positioned in rear of the other holders in the stack.

3. A magazine film holder for cameras, comprising telescopically engaged outer and inner casing members for receiving a stack of individual film holders, said casings in contracted positions having registering front openings for photographic exposure of the front film of the stack, a cover slide for closing the exposure openings of the outer casing, a spring actuated roller mounted on one of said casings, a curtain rolled thereon and connected to the other casing adapted to close the front opening of said inner casing when withdrawn from the outer casing to form a dark chamber therewithin, means connected to said inner casing for engaging the foremost film holder of the stack to withdraw the same into said dark chamber when said inner casing is drawn outward, and means in said dark chamber for transferring the film holder therein into a plane in rear of the stack whereby upon return of said inner casing said holder is positioned in rear of the other holders in the stack.

4. A magazine film holder for cameras, comprising telescopically engaged outer and inner casing members for receiving a stack of individual film holders, said casing in contracted position having registering front openings for photographic exposure of the front film of the stack, a cover slide for closing the exposure opening in the outer casing, a spring actuated roller mounted on one of said casings, a curtain rolled thereon and connected to the other casing adapted to cover the front opening of the inner casing when withdrawn from the outer casing, light sealing means for the margins of said curtain to form a dark chamber within the casing, means connected to said inner casing for engaging the foremost film holder of the stack to withdraw the same into said dark chamber when said inner casing is drawn outward, and means in said dark chamber for transferring the film holder therein into a plane in rear of the stack whereby upon return of said inner casing said holder is positioned in rear of the outer holders in the stack.

5. A magazine film holder for cameras, comprising telescopically engaged outer and inner casing members for receiving a stack of individual film holders, said casings in contracted position having registering front openings for photographic exposure of the front film of the stack, a cover slide for closing the exposure openings in the outer casing, a spring actuated roller mounted on one of said casing members, a curtain on said roller connected to the other casing, and grooved guides on said inner casing through which the marginal portions of said curtain are drawn during the outward movement of said inner casing thereby forming a light seal and a dark chamber for the transfer therein of film holders having exposed films from the front to the rear of the stack.

6. A magazine film holder for cameras, comprising telescopically engaged outer and inner casing members for receiving a stack of individual film holders, said casings in contracted position having registering front openings for photographic exposure of the front film of the stack, a cover slide for closing the exposure opening in the outer casing, means carried by one of said casings for closing the front of the inner casing when withdrawn from the outer casing thereby forming a dark chamber therewithin, a dog carried by said inner casing for engaging the foremost film holder of the stack and removing the same to said dark chamber when said inner casing is withdrawn, means for transferring the film holder in said dark chamber into a plane in rear of the stack, and resilient means for pressing the stack forward permitting the insertion of a film holder between the same and the stack during the return movement of said inner casing.

7. In a magazine film holder for cameras, telescopically engaged outer and inner casing members for receiving a stack of individual film holders, said casings in contracted position having registering front openings for photographic exposure of the front film of the stack, a cover slide for closing the exposure openings in the outer casing, a spring actuated curtain roller carried by the inner casing member, a curtain on said roller having its end connected to the outer casing and adapted to close the front of the inner casing when withdrawn to form a dark chamber therewithin, a shaft on which said roller is rotatably mounted, one end of said shaft extending out of said casing, lever arms connected to said shaft extending above and below the film holder in said dark chamber and engaging the same, and means actuated by the final outward movement of said inner casing when withdrawn from said outer casing for rocking said shaft thereby transferring the film holder in said dark chamber into a plane which is in rear of the stack.

8. In a magazine film holder for cameras, telescopically engaged outer and inner casing members for receiving a stack of individual film holders, said casings in contracted position having registered front openings for photographic exposure of the front film of the stack, a cover slide for closing the exposure openings in the outer casing, a spring actuated curtain roller carried by the inner casing member, a curtain on said roller having its end connected to the outer casing and adapted to close the front of the inner casing when withdrawn to form a dark chamber therewithin, a shaft on which said roller is rotatably mounted, one end of said shaft extending out of said casing, lever arms connected to said shaft extending above and below the film holder in said dark chamber and engaging the same, means actuated by the final outward movement of said inner casing when withdrawn from said outer casing for rocking said shaft thereby transferring the film holder in said dark chamber into a plane which is in rear of the stack, and a register actuated by the telescopic movement of said casing members for indicating the number of film holders of the stack which have been transferred from front to rear thereof.

9. A magazine film holder for cameras, comprising telescopically engaged outer and inner casing members for receiving a stack of individual film holders, said casings in contracted position having registered front openings for the exposure of the front film of the stack, a cover slide for closing the exposure opening in the outer casing, means carried by one of said casings for closing the opening in the front of the inner casing when withdrawn from the outer casing to form a dark chamber therewithin, means for removing the foremost film holder of the stack into said dark chamber by the outer movement of said inner casing, means within said dark chamber for transferring the film holder therein into a plane in rear of the stack, and resilient means for pressing the stack forward permitting the insertion of the film holder from said dark chamber between the same and the rear film holder of the stack.

ALPHEUS D. JOHNSON.

No references cited.